(12) United States Patent
Anisimovich et al.

(10) Patent No.: US 8,606,015 B2
(45) Date of Patent: *Dec. 10, 2013

(54) MULTILEVEL IMAGE ANALYSIS

(75) Inventors: Konstantin Anisimovich, Moscow (RU); Dmitry Deryagin, Moscow (RU); Vladimir Rybkin, Moscow (RU)

(73) Assignee: ABBYY Development LLC, Moscow (RU)

( * ) Notice: Subject to any disclaimer, the term of this patent is extended or adjusted under 35 U.S.C. 154(b) by 166 days.

This patent is subject to a terminal disclaimer.

(21) Appl. No.: 13/334,004

(22) Filed: Dec. 21, 2011

(65) Prior Publication Data

US 2012/0163719 A1 Jun. 28, 2012

Related U.S. Application Data

(63) Continuation-in-part of application No. 10/386,541, filed on Mar. 13, 2003, now Pat. No. 8,103,103.

(51) Int. Cl.
*G06K 9/46* (2006.01)

(52) U.S. Cl.
USPC ............ 382/195; 382/100; 382/181; 382/276

(58) Field of Classification Search
None
See application file for complete search history.

(56) References Cited

U.S. PATENT DOCUMENTS

| | | | |
|---|---|---|---|
| 5,321,770 A | 6/1994 | Huttenlocher et al. | |
| 5,359,667 A | 10/1994 | Burowski et al. | |
| 5,557,689 A | 9/1996 | Huttenlocher et al. | |
| 5,594,815 A | 1/1997 | Fast | |
| 5,848,184 A | 12/1998 | Taylor et al. | |
| 6,038,342 A | 3/2000 | Bernzott et al. | |
| 6,408,094 B1 | 6/2002 | Mirzaoff et al. | |
| 6,912,297 B2 | 6/2005 | Scott et al. | |

OTHER PUBLICATIONS

A. Jam and Y. Zhong, "Page Segmentation Using Texture Analysis." Pattern Recognition, vol. 29, pp. 743-770, 1996.
J. Ha, R. Haralick, and I. Phillips, "Recursive X-Y Cut Using Bounding Boxes of Connected Components," Proc. Third Int'l Conf. Document Analysis and Recog., pp. 952-955, 1995.
J. Ha, R. Haralick, and I. Phillips, "Document Page Decomposition by the Bounding-Box Projection Tee." Proc. Third Int'l Conf. Document Analysis and Recog., p. 1119-1122, 1995.

*Primary Examiner* — Bhavesh Mehta
*Assistant Examiner* — David F Dunphy
(74) *Attorney, Agent, or Firm* — LeighAnn Weiland; Aditya Krishnan

(57) ABSTRACT

Disclosed is a method of bit-mapped image analysis that comprises a whole image data representation via its component objects. The objects are assigned to different levels of complexity. The objects may be hierarchically connected by spatially-parametrical links. The method comprises preliminarily generating a classifier of image objects consisting of one or more levels differing in complexity; parsing the image into objects; attaching each object to one or more predetermined levels; establishing hierarchical links between objects of different levels; establishing links between objects within the same level; and performing an object feature analysis. Object feature analysis comprises generating and examining a hypothesis about object features and correcting the concerned object's features of the same and other levels in response to results of hypothesis examination. Object feature analysis may also comprise execution of a recursive X-Y cut within the same level.

20 Claims, 5 Drawing Sheets

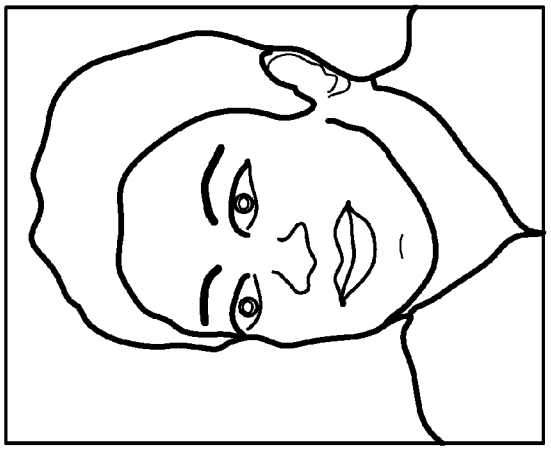

Fall Down
Seven Times,
Get up Eight

Handmade Search Engine by Grope

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

MULTILEVEL IMAGE ANALYSIS

CROSS-REFERENCE TO RELATED APPLICATIONS

For purposes of the USPTO extra-statutory requirements, the present application constitutes a continuation-in-part of U.S. patent application Ser. No. 10/386,541 titled MULTI-LEVEL BIT-MAPPED IMAGE ANALYSIS METHOD that was filed on 13 Mar. 2003 now U.S. Pat. No. 8,103,103, or is an application of which a currently co-pending application is entitled to the benefit of the filing date. Application Ser. No. 10/386,541, in turn claims priority to application 2002133898 that was filed in the Russian Federation on 17 Dec. 2002.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field of the Invention

The present invention relates generally to a field of image character recognition systems and, more particularly, to a method of pre-analysis and parsing of images received from a scanning device, camera or the like or obtained by other means.

2. Description of the Related Art

Segmentation and parsing methods are known in the art. Typically, such methods divide an image into parcels containing homogeneous objects and use a plurality of special computing procedures, each depending on a plurality of parameters, to analyze an object.

Known segmentation and parsing methods give little ability to perform a fully complete and overall analysis of objects since they use deficient data. Moreover, said methods require a large number of specialized computing procedures for analysis many of which depend on a quantity of objects multiplied by a number of parameters thereof.

The main limitation of known methods is that a great number of specialized computing procedures is required for each of a plurality of object types. Often, there is insufficient obtained subsidiary data to analyze all objects.

Another method of pre-processing, before character and text recognition of printed text of a bit mapped image, requires inputting scanned data into a bit-mapped file, parsing it into objects and performing a further analysis of each type of object by a specific computing means. The essential feature of such known methods lies in their ability to operate only with shape parameters. Such methods are inferior because they cannot perform an overall analysis because known methods do not use spatial parameters data.

Therefore, there is a substantial need for improved image analyses and methods, ones that do not require considerable analysis and concomitant consumption of resources. Further, a need exists for obtaining more informative results and results of higher accuracy.

SUMMARY

The present invention discloses a method for a preferably multilevel analysis of an image. An image may be obtained from a scanner or the like or from any other source. The analysis comprises whole image data representation via its components-objects. The objects are sorted into different levels of complexity and hierarchically connected therebetween by spatially-parametrical links. In particular, the analysis comprises preliminarily classifying all the text and non-text objects that can be present in a document into several levels of complexity, parsing the image into a plurality of regions and objects, attaching every object found in the image to one of the predefined levels or one of the predefined sets of levels differing in complexity, performing an analysis of the obtained regions and objects, extracting subsidiary data therefrom and using the said data in analysis. Further, results may be passed to a subsequent process, typically to a character recognition (CR) process or the like.

The present invention further discloses a method of making this process more informative, increasing analysis and recognition accuracy (such as in relation to a CR process), and reducing computational requirements for a computing apparatus, and thereby saving system resources.

BRIEF DESCRIPTION OF THE DRAWINGS

FIG. 4A is a version of the image shown in FIG. 4 translated into English to comply with the requirements of the USPTO.

DETAILED DESCRIPTION

Figure 1:
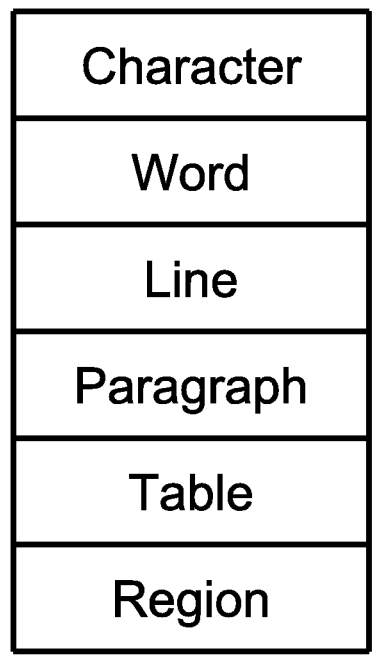
FIG. 1 and FIG. 2 are block diagrams showing some possible samples of classifiers where a set, number and contents of levels can differ greatly from those shown.

An exemplary implementation of the method of the present invention includes a preliminary analysis of an image or a part of an image and extracting and utilizing the maximum possible amount of supplemental data for the said analysis.

The most widely known methods deal with parsing of an initial image into objects and further applying a plurality of analyzing means to each parsed object. Thus, the set of computing means for analysis may increase greatly as the number of objects increases, resulting in an enormous increase in complexity of the whole system.

Most of the known methods use little or no supplemental data, thus losing accuracy.

One principle of the present invention involves representing all image data as a multilevel model. More complicated objects are defined via their less complicated components, and in turn, the less complicated components are linked between each other by one or more spatially-parametrical correlations.

Utilizing the method of the present invention, all types of objects that may appear in the analyzed image are preliminarily classified into several levels. Each level differs in complexity from other levels. The set of possible levels depends on the layout of the initial image or its part of the initial image. A layout can consist of text only, or text with tables, or formatted text with pictures (non-text regions) and/or tables, etc. In each case the classifier will comprise a different set of levels.

Analyzing and parsing an image (or a part of an image) is preferably performed in horizontal and vertical directions—sequentially or simultaneously. Searching objects in both directions (horizontal and vertical) is advantageous for example in Korean or Japanese magazines and newspapers, where text may be written in a horizontal or vertical direction and even in both directions on the same page.

Next, the whole image is parsed into objects that are regions, tables, paragraphs, lines, words, characters, part of character (e.g. part of a character may be used in a complex hieroglyphic character), etc. Then each object is referred or assigned to one (or more) of the predetermined levels of complexity. A system of links is established between the objects within each level. A system of links also may be established between objects of different levels.

The analysis can be started at the highest level of complexity or at the lowest level or at any intermediate level depending on the applied strategy.

The object's features comprise at least a list of objects of lower complexity incorporated into the object and a relationship factor estimation of objects within the same level of complexity. In a preferred implementation, the estimation should comprise at least one spatial estimation and at least one parametrical estimation.

The analysis on any level should comprise at least the steps of setting up a hypothesis about one or more features of an object, examining the hypothesis about said one or more features of the object, and correcting the concerned objects' features of the same and other levels depending on the hypothesis examination. Hypotheses are advanced and examined in both directions (horizontal and vertical), then the best direction of parsing may be chosen. The direction of parsing may be different in various parts of an image and can be chosen separately for each object within the same level of complexity.

Figure 4:
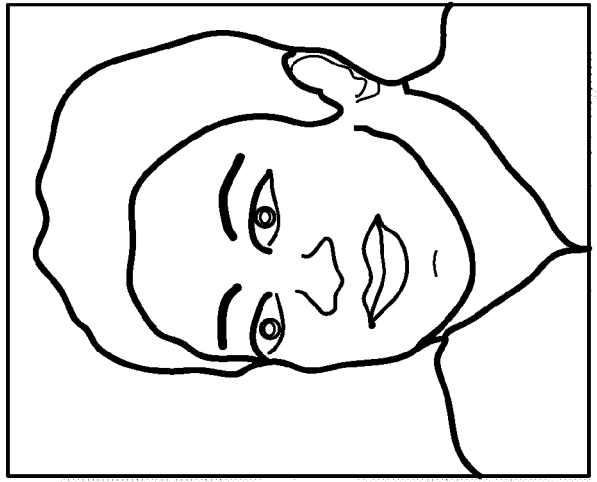
FIG. 4 is an example of an image with foreign text in a horizontal direction and foreign text in a vertical direction.

An example of an image with horizontal and vertical foreign text direction is shown on FIG. 4. The direction of text lines may be chosen differently, for example for each paragraph 401. A translation of the foreign text of FIG. 4 is shown in FIG. 4A.

To obtain subsidiary data on an object's features, a recursive X-Y cut on an object can be performed on any level. This can sometimes get more subsidiary data concerning the object's features, and can confirm a parsing direction and a hypothesis concerning objects of any other level. For example, in a case of three levels, a recursive X-Y cut can be performed on an object of a first level, and can confirm a parsing direction and a hypothesis for an object in a second level and/or for an object in a third level.

The method of a recursive X-Y cut includes parsing an image into non-intersected regions within one level of complexity. Each region includes objects with close spatial and parametrical features. For each region a set of features common to all objects of the region is defined. Then a complete analysis of all regions is performed where a complete analysis includes, for example, at least multilevel parsing, forming and examining one or more hypotheses, and obtaining subsidiary data using a recursive X-Y cut. Alternatively, a complete analysis is an analysis based on information obtained up to a certain point in time or up to a current time (time of executing the complete analysis). Feature restrictions or extensions concerning features common for the regions are added to each region. The corresponding features amendments are made. In the case of any considerable discrepancy between initial features and new features of an object, the object can be eliminated from the region. As a result of an recursive X-Y cut analysis, some regions with close (proximate) features, separated by non-text objects, can be combined into a new object. The main result of the analysis and combination of regions lies in obtaining a new volume of subsidiary data on an object's features.

Figure 2:
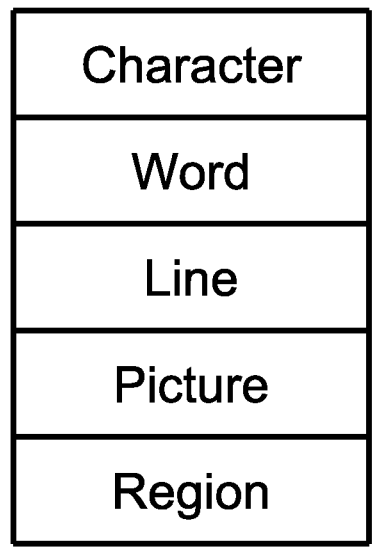

Referring now to FIG. 1 and FIG. 2, the structure of the classifier can vary greatly and depends mainly upon the image layout, the set of possible objects in the image, targets of analysis, etc. FIG. 1 shows examples of categories into which a classifier may divide objects of an image. These categories can be the basis for a classifier. FIG. 2 likewise shows an exemplary set of categories into which a classifier may divide objects of an image.

Figure 3:
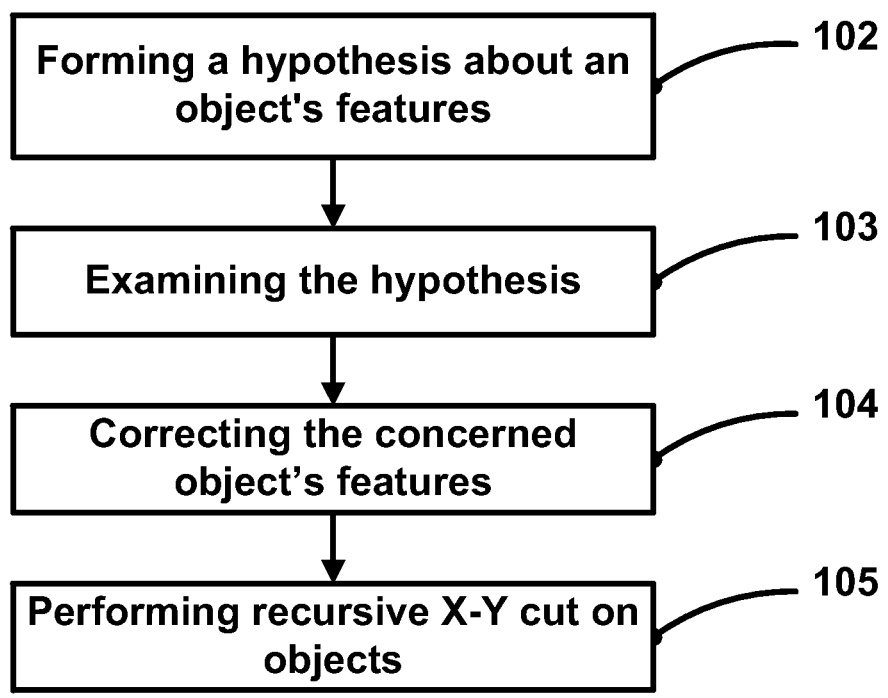
FIG. 3 is a block diagram showing steps that may be made on analysis of objects of any level according to an exemplary implementation of the present invention.

FIG. 3 shows an example of analyzing steps (or a list) that should be applied according to the present invention to each object of every level in the course of the analysis process.

With reference to FIG. 3, Block 102 may be forming a hypothesis about an object's features. Block 103 may be examining the hypothesis about the object's features. Block 104 may be correcting the concerned object's features of the same and other levels. Block 105 may be executing at least one recursive X-Y cut on objects.

Thus, the method of the present invention allows one to apply subsidiary data for analysis, decrease the computing means necessary to perform the analysis, raise the accuracy of the analysis, and reduce mistakes in the analysis and subsequent processes.

Figure 5:
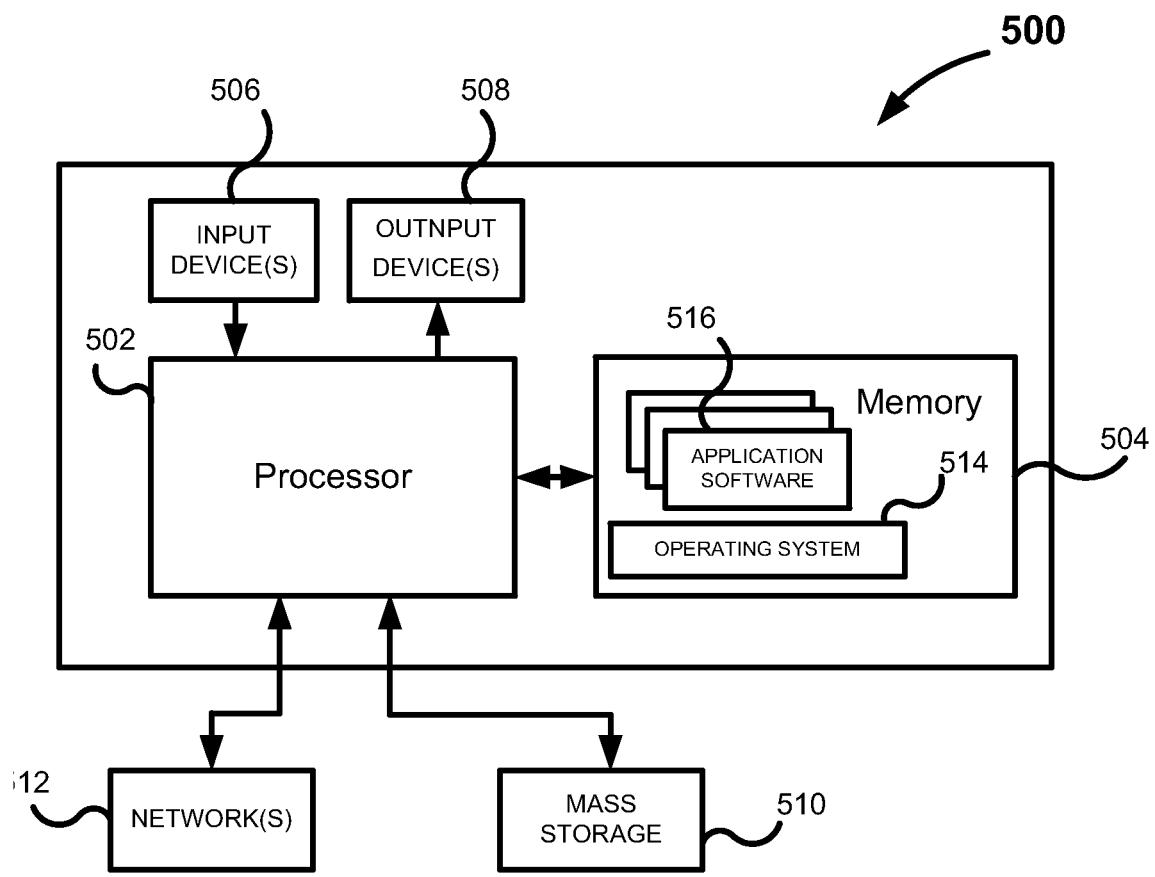
FIG. 5 shows an example of a system by which the invention may be practiced.

FIG. 5 of the drawings shows an example of a system 500. Depending on the use of the system 500, it may be a system for image analysis, optionally includes OCR capabilities. The system 500 may be operable to implement the exemplary method of FIG. 3. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also typically receives a number of inputs and outputs for communicating information externally. For interface with a user or operator, the system 500 may include one or more user input devices 506 (e.g., a keyboard, a mouse, imaging device, etc.) and one or more output devices 508 (e.g., a Liquid Crystal Display (LCD) panel, a sound playback device (speaker, etc)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 typically includes suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512, e.g. in a distributed computing environment, whereby the processing required to implement the functions of a computer program may be allocated to multiple computers over a network. The application software 516 may include a set of instructions which, when executed by the processor 502, causes the system 500 to implement the method 200 or the method 300.

In general, the routines executed to implement the embodiments of the invention may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

We claim:

1. A device for performing image analysis, the device comprising:
   a processor;
   a memory in electronic communication with the processor, wherein the memory is configured with instructions, the instructions comprising:
      classifying types of objects that are present within an image into one or more levels differing in complexity;
      parsing the said image into objects;
      attaching every said object to one of said levels of complexity;
      establishing links between said objects of said different levels of complexity;
      establishing links between said objects within each level of complexity;
      performing an object feature analysis, said object feature analysis comprising:
         forming a hypothesis about a spatial feature or a parametrical feature of the object, wherein the spatial feature or the parametrical feature is associated with a level of complexity,
         examining the said hypothesis about the spatial feature or the parametrical feature of the object, and
         when necessary, correcting the spatial feature or the parametrical feature of the object of the same and other levels depending on a result from the said examining of the hypothesis.

2. The device as recited in claim 1, wherein said object feature analysis further comprises execution of at least one recursive X-Y cut on objects within a same level of complexity.

3. The device as recited in claim 1, wherein said hypothesis about a spatial feature or a parametrical feature of the object comprises at least a list of objects of lower complexity incorporated into the object, and wherein the method further comprises outputting the results to a subsequent process.

4. The device as recited in claim 3, wherein said image analysis is performed by moving from a higher complexity level to a lower complexity level and wherein the subsequent process is a character recognition process.

5. The device as recited in claim 1, wherein said image analysis is performed by moving from a lower complexity level to a higher complexity level, and wherein the spatial feature or the parametrical feature of the object includes at least the following data:
   a list of objects of lower complexity incorporated into the object subject to the object feature analysis, and
   a relationship factor estimation of objects within a same level of complexity, said relationship factor estimation including at least a spatial estimation and a parametrical estimation.

6. The device as recited in claim 1, wherein said image analysis is performed by applying the method to any level and further moving to any level in an order and a number of times as determined by the image analysis, and wherein the image analysis is performed by moving from a higher complexity level to a lower complexity level.

7. The device as recited in claim 1, wherein said image analysis is performed by moving from a lower level of complexity to a higher level of complexity.

8. The device as recited in claim 1, wherein said image analysis is performed by applying the image analysis to a given level of complexity and subsequently applying it to a lower level of complexity or to a higher level of complexity.

9. The device as recited in claim 1, wherein the levels of complexity include characters, word tokens, words, lines, paragraphs, regions, tables, and non-text regions.

10. The device as recited in claim 9, wherein after examining a hypothesis at least at one level of complexity, performing a recursive X-Y cut to obtain subsidiary data about a spatial feature or a parametrical feature of the same and other levels.

11. One or more physical non-transitory computer-readable media configured with instructions for processing in an image, the instructions comprising:
   classifying types of objects that are present within an image into one or more levels differing in complexity;
   parsing the said image into objects;
   attaching every said object to one of said levels of complexity;
   establishing links between said objects of said different levels of complexity;
   establishing links between said objects within each level of complexity;
   performing an object feature analysis, said object feature analysis comprising:
   forming a hypothesis about a spatial feature or a parametrical feature of the object, wherein the spatial feature or the parametrical feature is associated with a level of complexity,
   examining the said hypothesis about the spatial feature or the parametrical feature of the object, and
   when necessary, correcting the spatial feature or the parametrical feature of the object of the same and other levels depending on a result from the said examining of the hypothesis.

12. The one or more physical non-transitory computer-readable media as recited in claim 11, wherein said object feature analysis further comprises execution of at least one recursive X-Y cut on objects within a same level of complexity.

13. The one or more physical non-transitory computer-readable media as recited in claim 11, wherein said hypothesis about a spatial feature or a parametrical feature of the object comprises at least a list of objects of lower complexity incorporated into the object, and wherein the method further comprises outputting the results to a subsequent process.

14. The one or more physical non-transitory computer-readable media as recited in claim 13, wherein said image analysis is performed by moving from a higher complexity level to a lower complexity level and wherein the subsequent process is a character recognition process.

15. The one or more physical non-transitory computer-readable media as recited in claim 11, wherein said image analysis is performed by moving from a lower complexity level to a higher complexity level, and wherein the spatial feature or the parametrical feature of the object includes at least the following data:
   a list of objects of lower complexity incorporated into the object subject to the object feature analysis, and
   a relationship factor estimation of objects within a same level of complexity, said relationship factor estimation including at least a spatial estimation and a parametrical estimation.

16. The one or more physical non-transitory computer-readable media as recited in claim 11, wherein said image analysis is performed by applying the method to any level and further moving to any level in an order and a number of times as determined by the image analysis, and wherein the image analysis is performed by moving from a higher complexity level to a lower complexity level.

17. A method for analyzing an image or part of an image with objects, the method comprising:
   parsing the image into objects;
   assigning a plurality of objects present within the image into one or more levels, wherein each level differs in complexity from all other levels;
   performing an object feature analysis on one or more objects, said object feature analysis including:
   forming a hypothesis about a spatial feature of the object in a horizontal direction and in a vertical direction, wherein the spatial feature is associated with a level of complexity,
   examining the hypothesis in a horizontal direction and in a vertical direction;
   selecting a best direction for parsing of a remainder of objects based at least in part upon said examining of the hypothesis in the horizontal direction and in the vertical direction;
   examining the said hypothesis about the spatial feature or the parametrical feature of the object, and
   when necessary, correcting the spatial feature or the parametrical feature of the object of the same and other levels depending on a result from the said examining of the hypothesis.

18. The method of claim 17, wherein the method further comprises:
   after assigning the plurality of objects into one or more levels, establishing links between objects of one level with objects assigned to another level of complexity.

19. The method of claim 17, wherein direction of parsing is chosen separately for each object within the same level of complexity.

20. The method of claim 17, wherein the object feature analysis includes:
   performing a recursive X-Y cut by parsing the image into non-intersected regions within one level of complexity.

* * * * *

UNITED STATES PATENT AND TRADEMARK OFFICE
CERTIFICATE OF CORRECTION

PATENT NO. : 8,606,015 B2  
APPLICATION NO. : 13/334004  
DATED : December 10, 2013  
INVENTOR(S) : Konstantin Anisimovich et al.

Page 1 of 1

It is certified that error appears in the above-identified patent and that said Letters Patent is hereby corrected as shown below:

On the Title Page

Below item (65), the Prior Publication Data, insert the lines:
--(30) Foreign Application Priority Data
2002-12-17    RU    2002133898--

Signed and Sealed this
Twenty-fourth Day of April, 2018

Andrei Iancu
*Director of the United States Patent and Trademark Office*